(12) United States Patent
White

(10) Patent No.: US 8,651,751 B2
(45) Date of Patent: Feb. 18, 2014

(54) APPARATUS AND PROCESS FOR TERMINATION OF POLYMER OPTICAL FIBER RIBBONS

(71) Applicant: Chromis Fiberoptics, Inc., Warren, NJ (US)

(72) Inventor: Whitney R. White, Watchung, NJ (US)

(73) Assignee: Chromis Fiberoptics, Inc., Warren, NJ (US)

( * ) Notice: Subject to any disclaimer, the term of this patent is extended or adjusted under 35 U.S.C. 154(b) by 0 days.

(21) Appl. No.: 13/677,705

(22) Filed: Nov. 15, 2012

(65) Prior Publication Data

US 2013/0121644 A1     May 16, 2013

Related U.S. Application Data

(60) Provisional application No. 61/559,776, filed on Nov. 15, 2011.

(51) Int. Cl.
*G02B 6/36*     (2006.01)

(52) U.S. Cl.
USPC ............ 385/76; 385/53; 385/77; 385/78; 385/100; 385/114

(58) Field of Classification Search
USPC ............ 385/53, 76, 77, 78, 100, 114
See application file for complete search history.

(56) References Cited

U.S. PATENT DOCUMENTS 7,056,031 B2 *   6/2006   Neubauer et al. .......... 385/85
8,463,439 B2 *   6/2013   Blumenkranz et al. ..... 700/258

* cited by examiner

*Primary Examiner* — Jennifer Doan
(74) *Attorney, Agent, or Firm* — Thomas | Horstemeyer, LLP

(57) ABSTRACT

In the present disclosure, a termination apparatus and process is disclosed that optimizes the termination of polymer optical fiber ribbons, eliminates the need for a ferrule and connector, and utilizes lower-cost materials instead of diamond for the cutting blade.

20 Claims, 3 Drawing Sheets

APPARATUS AND PROCESS FOR TERMINATION OF POLYMER OPTICAL FIBER RIBBONS

CROSS-REFERENCE TO RELATED APPLICATION

This application claims priority to co-pending U.S. provisional application entitled "Apparatus and Process for Termination of Polymer Optical Fiber Ribbons," having Ser. No. 61/559,776 filed on Nov. 15, 2011, which is entirely incorporated herein by reference.

BACKGROUND

In the field of optical communications, multiple optical data streams are commonly carried on different fibers located within the same cable. These optical fiber ribbons are typically comprised of two or more optical fibers (based on either glass or plastic optical fibers) disposed within a UV-curable adhesive (typically acrylate) matrix material. An example of prior art for termination of plastic optical fibers attached to a connector housing includes an apparatus and process disclosed in U.S. Pat. No. 6,361,220.

SUMMARY

Embodiments of the present disclosure include apparatus and methods for terminating polymer optical fiber ribbons.

Briefly described, embodiments of the present disclosure include an apparatus for terminating a polymer optical fiber ribbon, comprising a rigid framework, a cutting blade, where the cutting blade is mounted on a rotatable blade holder, an electronically controllable motor, where the electronically controllable motor rotates the blade holder around a defined rotational axis, a motorized translation stage, where the motorized translation stage is separately controlled to provide variable translation speed parallel or anti-parallel to the axis of rotation of the blade holder, a collet, where the collet is fixed to the framework, and where the collet holds the optical fiber ribbon at a location such that the cutting blade passes through the optical fiber ribbon as the cutting blade rotates, and contains a channel, where the channel is threaded by the polymer optical fiber ribbon and comprises dimensions and shape at an exit from the collet such that there is a gap of less than about 400 µm between any point on an inner surface of the channel and a nearest point on the outer surface of the polymer optical fiber ribbon.

Embodiments of the present disclosure include a method for terminating a polymer optical fiber ribbon comprising securing a polymer optical fiber ribbon in a rigid framework using a collet, where the collet comprises a channel, where the channel is threaded by the polymer optical fiber ribbon and comprises dimensions and shape at an exit from the collet such that there is a gap of less than about 400 µm between any point on an inner surface of the channel and a nearest point on an outer surface of the polymer optical fiber ribbon, passing a cutting blade, where the cutting blade is mounted on a rotatable holder, through the polymer optical fiber ribbon, and moving the cutting blade holder as the blade rotates, so that the blade cuts at least one slice, wherein the at least one slice comprises a thickness of about 1 to 200 microns, from the surface of the polymer optical fiber ribbon.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
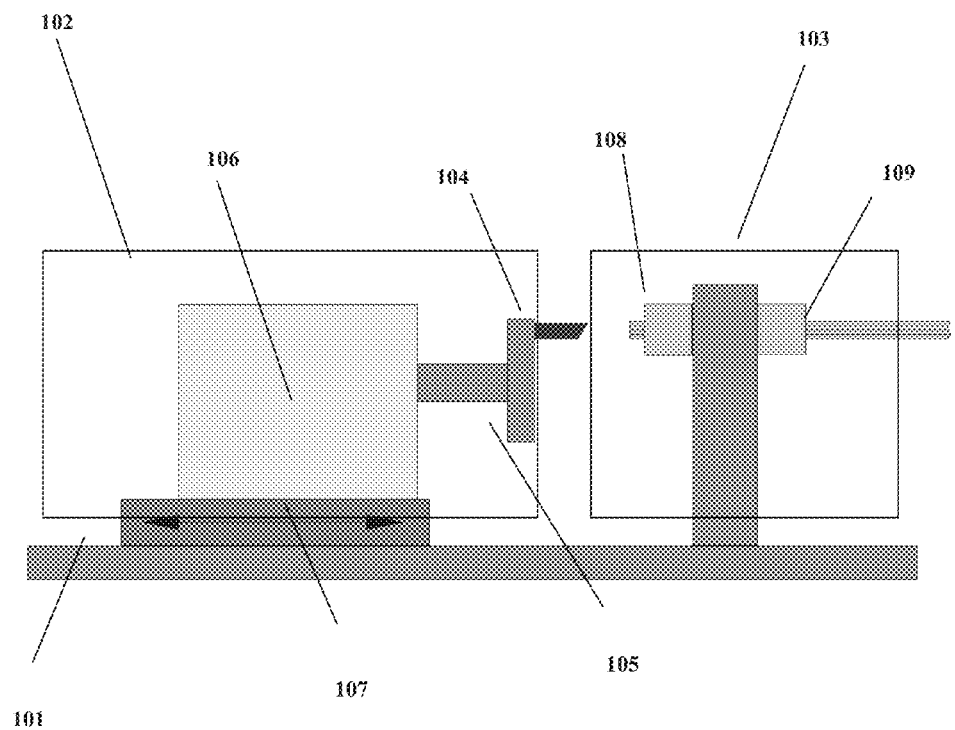
FIG. 1 is a schematic drawing that illustrates an apparatus for terminating polymer optical fiber ribbons according to an embodiment of the present disclosure.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions:

A polymer optical fiber ribbon as used herein is defined as a set of at least two polymer optical fibers, which are disposed parallel to each other, and which are held together by an adhesive layer.

A collet as used herein is defined as a fixture that closely holds the fiber during cutting, thereby reducing vibration of the ribbon during the cutting process, and producing a smoother surface after cutting.

Discussion:

Application Serial No. PCT/US2012/61036, which is herein incorporated by reference in its entirety, discloses a new type of optical fiber ribbon, comprised of polymeric optical fibers, which may be terminated as a single unit without stripping. This new type of optical fiber ribbon is comprised of polymer optical fibers extruded with a very high degree of dimensional accuracy, and held together by a very thin ribbon matrix layer. In this structure, the external surface of the ribbon matrix material may be used as a reference surface for aligning all of the cores of the constituent optical fibers with optical sources or detectors. This feature simplifies the termination of the optical fiber, by eliminating the need for removal of the ribbon matrix material when terminating the ribbon. To maximize the utility of this new type of optical fiber ribbon, it is desirable to have a termination process that produces very clean faces on the ends of the constituent fibers, so that they may be coupled with minimal loss and cross-talk to optical emitters and detectors.

In the present disclosure, a termination apparatus and process is disclosed that: (i) optimizes the termination of polymer optical fiber ribbons, (ii) eliminates the need for a ferrule and connector, and (iii) utilizes lower-cost materials instead of diamond for the cutting blade.

In the field of optical communications, multiple optical data streams are commonly carried on different fibers located within the same cable. These optical fiber ribbons are typically comprised of two or more glass optical fibers disposed within a UV-curable adhesive (typically acrylate) matrix material. This matrix material, including the adhesive (typically, acrylate) coating found on the outside of the individual fibers prior to ribbonizing, holds the fibers together. However, it does not enforce a very accurate spacing between the optical fiber cores, and it does not form a suitable surface for referencing optical emitters and detectors to the fiber cores. Accordingly, in order to use such optical fiber ribbons, the adhesive material must be stripped from the ends, so that the glass surfaces of the individual fibers may be used as a reference surface for aligning optical emitters and detectors to the fiber cores.

An example of prior art for termination of plastic optical fibers attached to a connector housing includes an apparatus and process disclosed in U.S. Pat. No. 6,361,220. According to this prior art, a plastic optical fiber inside of a connector assembly (including a ferrule surrounding the fiber) may be terminated using a rotating diamond blade that is also driven laterally by a separate motor. In this prior art, the rotating blade removes thin slices from the end of the fiber and connector assembly, resulting in a very flat, smooth surface on the terminated end of the fiber. The prior art also discloses methods to optimize this process by holding the connectorized fiber and by controlling the lateral translation speed of the rotating blade. Finally, the '220 patent discusses the termination of multiple, separate optical fibers through the use of multiple holders, but it does not address termination of plastic optical fiber ribbons.

As shown in FIG. 1, the apparatus of the present disclosure is comprised of framework 101 which rigidly and accurately locates an active, moving subassembly 102 with respect to another, passive, stationary subassembly 103. The framework 101 is typically comprised of a molded or machined metal structure to which the moving subassembly 102 and the passive subassembly 103 are connected with metal screws. Generally, this framework is rigid enough that the relative positions of the assemblies do not change by more than about one-thousandth of an inch, when subject to the forces normally encountered in handling or moving the apparatus. The active subassembly 102 contains a sharp cutting blade 104, which is mounted on a rotatable holder 105 that is driven by an electronically controllable motor 106. The diameter of rotation of the cutting blade 104 is typically about 2 to 8 cm. The active assembly 102 also contains a motorized translation stage 107, which is separately controlled to provide variable translation speed parallel or anti-parallel to the axis of rotation of the blade holder 105.

In the passive subassembly 103, the collet 108 holds the polymer optical fiber ribbon 109 so that the longitudinal axis of the constituent fibers in the ribbon is at a well-controlled angle with respect to the axis of rotation of the blade holder 105. Typically, the collet 108 holds the polymer optical fiber ribbon 109 so that the longitudinal axis of the fibers is parallel to the axis of rotation of the blade holder 105. However, other angles may be chosen, for example, when an angle-cut ribbon surface is desired to minimize optical back-reflections.

Figure 2:
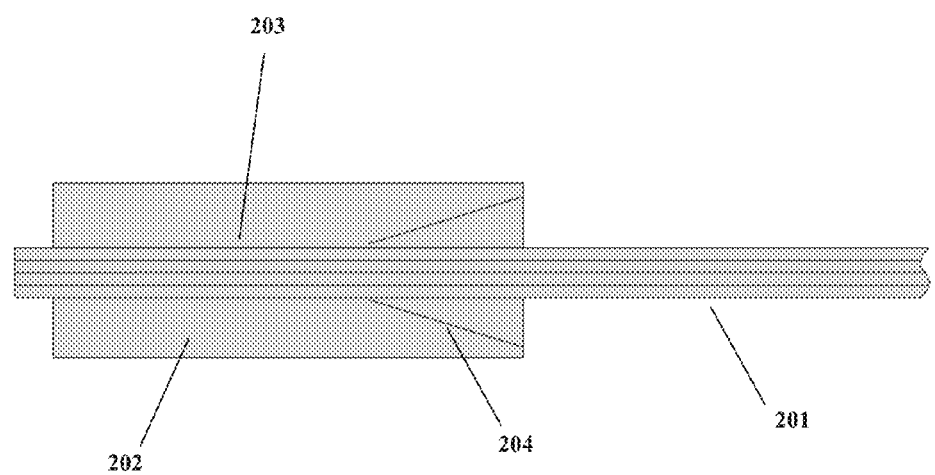
FIG. 2 illustrates a longitudinal section of the apparatus illustrated in FIG. 1 through a ribbon holding collet, showing the location of polymer optical fiber within the collet and the guide chamfer at the back of the collet according to an embodiment of the present disclosure.

FIG. 2 shows a longitudinal cross-section of the polymer optical fiber ribbon 201 located within the holding collet 202. The collet 202 is typically composed of a plastic material, and contains a channel 203 that is cut to closely fit the polymer optical fiber ribbon over most of the length of the collet 202. Near the back end of the collet 202 (the side furthest from the cutting blade) there is typically a guide chamfer 204 to facilitate insertion of the optical fiber ribbon 201 through the close-fitting channel 203.

Figure 3:
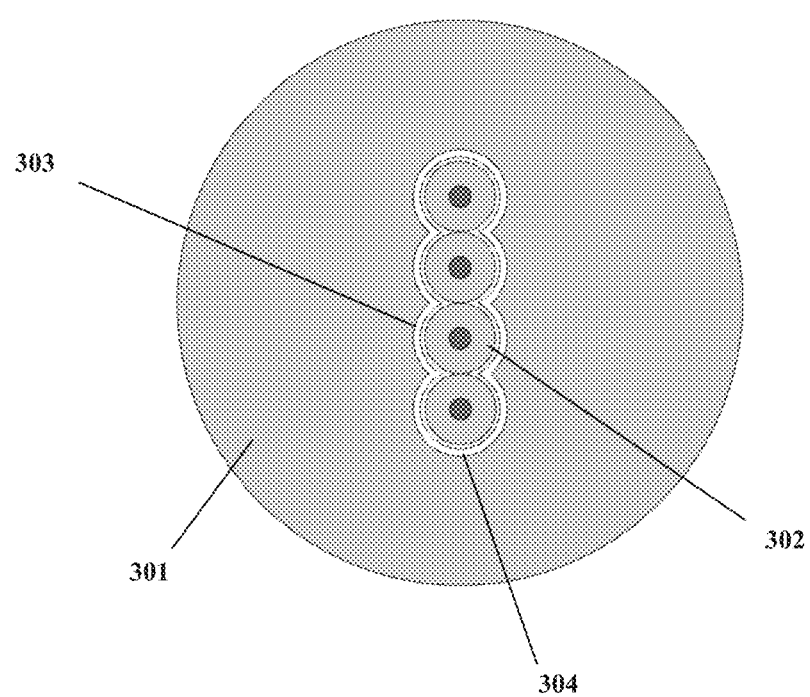
FIG. 3 illustrates an end view of the apparatus illustrated in FIGS. 1 and 2 of a ribbon holding collet and ribbon, as seen from the side of the apparatus where the cutting blade is located according to an embodiment of the present disclosure.

FIG. 3 shows a typical end view (as seen from the side closest to the cutting blade) of the collet 301, with the polymer optical fiber ribbon 302 projecting from the channel 303 that runs longitudinally (perpendicular to the plane of this figure) through the collet 301. A principal aspect of the present disclosure is that the dimensions and shape of the channel 303 at the exit from the collet 301 are chosen to provide a well-controlled, approximately uniform, gap 304 between the collet channel 303 and the outer surfaces of the polymer optical fiber ribbon 302. In an embodiment, the size of this gap is about 250 microns or less. In this way, a superior termination result is achieved, because the collet 301 constrains the motion of the ribbon 302 as the blade cuts repeatedly through it. This constraint against motion of the ribbon prevents "chatter" marks and other forms of deformation well known in the art. The usage of a close-fitting collet 301 for holding and constraining an unconnectorized ribbon 302 also prevents the need seen in the prior art for use of a ferrule and other connector apparatus to hold the piece undergoing termination.

In the present disclosure, many materials are suitable for the cutting blade. These include, but are not limited to, diamond, as well as many other very hard materials, including tungsten carbide, silicon carbide, and cubic boron nitride. A variety of other materials with a Mohs scale hardness greater than about 7 may also be chosen. The optimal choice of blade material depends on a tradeoff between blade cost and blade lifetime.

In order to terminate a polymer optical fiber ribbon with the apparatus described above, the ribbon is first inserted into the collet and then secured against longitudinal motion. Typically, the ribbon is inserted so that it projects past the front face of the collet by an amount typically in the range of about 0.5 to 2 mm. Then, rotation of the blade holder is started, typically at a speed of about 100-300 rpm. Next, the translation stage begins moving the rotating blade toward the end of the polymer optical fiber ribbon, and the blade cuts numerous thin slices from the end of the ribbon as it moves forward. When the translation stage reaches a pre-defined limit, it then begins moving in the opposite direction, so that the blade moves away from the cut surface of the ribbon. Typically this pre-defined limit is set so that the blade cuts the ribbon as close as possible to the surface of the collet, typically within about 100 μm. This process leaves a smooth flat surface on each of the constituent fibers in the ribbon, typically with little or no disruption of the adhesion between the constituent fibers. Optionally, compressed air may be used to blow debris away from the surface of the terminated ribbon. Typically, the polymer optical ribbon is withdrawn directly from the termination process and inserted into an optical subassembly, which aligns the optical cores with respect to an array of optical emitters and/or detectors.

Embodiments of the present disclosure include an apparatus for terminating a polymer optical fiber ribbon, comprising a rigid framework, a cutting blade, where the cutting blade is mounted on a rotatable blade holder, an electronically controllable motor, where the electronically controllable motor rotates the blade holder around a defined rotational axis, a motorized translation stage, where the motorized translation stage is separately controlled to provide variable translation speed parallel to the axis of rotation of the blade holder, a collet, where the collet is fixed to the framework, and where the collet holds the optical fiber ribbon at a location such that the cutting blade passes through the optical fiber ribbon as the cutting blade rotates, and contains a channel, where the channel is threaded by the polymer optical fiber ribbon and comprises dimensions and shape at an exit from the collet such that there is a gap of less than about 400 μm between any point on an inner surface of the channel and a nearest point (i.e., a nearest point to the any point on the inner surface) on the outer surface of the polymer optical fiber ribbon. In an embodiment, the motorized translation stage is separately controlled to provide variable translation speed anti-parallel to an axis of rotation of the blade holder.

Embodiments of the present disclosure include an apparatus for terminating a polymer optical fiber ribbon where the channel comprises dimensions and shape at an exit from the collet such that there is a gap of less than about 200 μm between any point on the inner surface of the channel and the nearest point on the outer surface of the polymer optical fiber ribbon. In an embodiment, the channel comprises dimensions and shape at an exit from the collet such that there is a gap of less than about 100 μm between any point on the inner surface of the channel and the nearest point on the outer surface of the polymer optical fiber ribbon. In another embodiment, the channel comprises dimensions and shape at an exit from the collet such that there is a gap of less than about 50 μm between any point on the inner surface of the channel and the nearest point on the outer surface of the polymer optical fiber ribbon. In another embodiment, the channel comprises dimensions and shape at an exit from the collet such that there is a gap of less than about 20 μm between any point on the inner surface of the channel and the nearest point on the outer surface of the polymer optical fiber ribbon. In another embodiment, the channel comprises dimensions and shape at an exit from the collet such that there is a gap of less than about 5 μm between any point on the inner surface of the channel and the nearest point on the outer surface of the polymer optical fiber ribbon.

Embodiments of the present disclosure include an apparatus for terminating a polymer optical fiber ribbon where the cutting blade is comprised of a material with a Mohs hardness of at least about 7. In an embodiment, the cutting blade is comprised of a material with a Mohs hardness of at least about 8. In another embodiment, the cutting blade is comprised of a material with a Mohs hardness of at least about 9.

Embodiments of the present disclosure include an apparatus for terminating a polymer optical fiber ribbon where the cutting blade is comprised of a material selected from diamond, cubic boron nitride, tungsten carbide, a ceramic, and a combination thereof.

Embodiments of the present disclosure include an apparatus for terminating a polymer optical fiber ribbon where an angle between the rotational axis of the blade holder and a longitudinal axis of constituent fibers of the optical fiber ribbon is less than about 5 degrees. In an embodiment, an angle between the rotational axis of the blade holder and a longitudinal axis of constituent fibers of the optical fiber ribbon is at least about 5 degrees.

Embodiments of the present disclosure include a method for terminating a polymer optical fiber ribbon comprising securing a polymer optical fiber ribbon in a rigid framework using a collet, where the collet comprises a channel, where the channel is threaded by the polymer optical fiber ribbon and comprises dimensions and shape at an exit from the collet such that there is a gap of less than about 400 μm between any point on an inner surface of the channel and a nearest point on an outer surface of the polymer optical fiber ribbon, passing a cutting blade, where the cutting blade is mounted on a rotatable holder, through the polymer optical fiber ribbon, and moving the cutting blade holder as the blade rotates, so that the blade cuts at least one slice, wherein the at least one slice comprises a thickness of about 1 to 200 microns, from the surface of the polymer optical fiber ribbon. In an embodiment, the blade cuts multiple thin slices (e.g., the slices comprise a thickness of about 1 to 200 microns).

EXAMPLES

Example 1

An apparatus for terminating a polymer optical fiber ribbon comprised of 6 optical fibers, each with an outer diameter of about 250+/−5 μm. The fibers are held together by a UV-cured aliphatic urethane acrylate resin sold by Bayer Material Science, LLC under the trade name DESMOLUX® U100. The collet that holds the ribbon during termination is made by a stereolithographic rapid prototyping process, and the dimensions and shape of the channel at the exit from the collet is such that there is a gap of not more than 200 μm between each point on the inner surface of channel and the nearest point on the outer surface of the polymer optical fiber ribbon. A diamond blade is used in the termination apparatus.

Example 2

An apparatus for terminating a polymer optical fiber ribbon comprised of 4 optical fibers, each with an outer diameter of about 600+/−5 μm. The fibers are held together by a UV-cured aliphatic urethane acrylate resin sold by Bayer Material Science, LLC under the trade name DESMOLUX® U100. The collet that holds the ribbon during termination is made by a stereolithographic rapid prototyping process, and the dimensions and shape of the channel at the exit from the collet is such that there is a gap of not more than about 100 μm between each point on the inner surface of channel and the nearest point on the outer surface of the polymer optical fiber ribbon. A tungsten carbide blade is used in the termination apparatus.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt% to about 5 wt%, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In an embodiment, the term "about" can include traditional rounding according to the numerical value. In addition, the phrase "about 'x' to 'y'" includes "about 'x' to about 'y'".

It should be emphasized that the above-described embodiments of the present disclosure are merely possible examples of implementations, and are merely set forth for a clear understanding of the principles of the disclosure. Many variations and modifications may be made to the above-described embodiments. All such modifications and variations are intended to be included herein within the scope of this disclosure and protected by the following claims.

Therefore, at least the following is claimed:

1. An apparatus for terminating a polymer optical fiber ribbon, comprising:
   a rigid framework;
   a cutting blade, wherein the cutting blade is mounted on a rotatable blade holder;
   an electronically controllable motor, wherein the electronically controllable motor rotates the blade holder around a defined rotational axis;
   a motorized translation stage, wherein the motorized translation stage is separately controlled to provide variable translation speed parallel to an axis of rotation of the blade holder; and
   a collet, wherein the collet is fixed to the framework, and wherein the collet:
      holds the optical fiber ribbon at a location such that the cutting blade passes through the optical fiber ribbon as the cutting blade rotates, and contains a channel, wherein the channel is threaded by the polymer optical fiber ribbon and comprises dimensions and shape at an exit from the collet such that there is a gap of less than about 400 μm between any point on an inner surface of the channel and a nearest point on an outer surface of the polymer optical fiber ribbon.

2. The apparatus of claim 1, wherein the motorized translation stage is separately controlled to provide variable translation speed anti-parallel to the axis of rotation of the blade holder.

3. The apparatus of claim 1, wherein the channel comprises dimensions and shape at an exit from the collet such that there is a gap of less than about 200 μm between any point on the inner surface of the channel and the nearest point on the outer surface of the polymer optical fiber ribbon.

4. The apparatus of claim 1, wherein the channel comprises dimensions and shape at an exit from the collet such that there is a gap of less than about 100 μm between any point on the inner surface of the channel and the nearest point on the outer surface of the polymer optical fiber ribbon.

5. The apparatus of claim 1, wherein the channel comprises dimensions and shape at an exit from the collet such that there is a gap of less than about 50 μm between any point on the inner surface of the channel and the nearest point on the outer surface of the polymer optical fiber ribbon.

6. The apparatus of claim 1, wherein the channel comprises dimensions and shape at an exit from the collet such that there is a gap of less than about 20 μm between any point on the inner surface of the channel and the nearest point on the outer surface of the polymer optical fiber ribbon.

7. The apparatus of claim 1, wherein the channel comprises dimensions and shape at an exit from the collet such that there is a gap of less than about 5 μm between any point on the inner surface of the channel and the nearest point on the outer surface of the polymer optical fiber ribbon.

8. The apparatus of claim 1, wherein the cutting blade is comprised of a material with a Mohs hardness of at least about 7.

9. The apparatus of claim 2, wherein the cutting blade is comprised of a material with a Mohs hardness of at least about 7.

10. The apparatus of claim 1, wherein the cutting blade is comprised of a material with a Mohs hardness of at least about 8.

11. The apparatus of claim 2, wherein the cutting blade is comprised of a material with a Mohs hardness of at least about 8.

12. The apparatus of claim 1, wherein the cutting blade is comprised of a material with a Mohs hardness of at least about 9.

13. The apparatus of claim 2, wherein the cutting blade is comprised of a material with a Mohs hardness of at least about 9.

14. The apparatus of claim 1, wherein the cutting blade is comprised of a material selected from the group consisting of: diamond, cubic boron nitride, tungsten carbide, a ceramic, and a combination thereof.

15. The apparatus of claim 2, wherein the cutting blade is comprised of a material selected from the group consisting of: diamond, cubic boron nitride, tungsten carbide, a ceramic, and a combination thereof.

16. The apparatus of claim 1, wherein an angle between the rotational axis of the blade holder and a longitudinal axis of constituent fibers of the optical fiber ribbon is less than about 5 degrees.

17. The apparatus of claim 2, wherein an angle between the rotational axis of the blade holder and a longitudinal axis of constituent fibers of the optical fiber ribbon is less than about 5 degrees.

18. The apparatus of claim 1, wherein an angle between the rotational axis of the blade holder and a longitudinal axis of constituent fibers of the optical fiber ribbon is at least about 5 degrees.

19. The apparatus of claim 2, wherein an angle between the rotational axis of the blade holder and a longitudinal axis of constituent fibers of the optical fiber ribbon is at least about 5 degrees.

20. A method for terminating a polymer optical fiber ribbon using an apparatus comprising a rigid framework, a cutting blade mounted on a rotatable blade holder, an electronically controllable motor, a motorized translation stage, and a collet, comprising:
   securing the polymer optical fiber ribbon in the rigid framework using the collet, wherein the collet comprises a channel, wherein the channel is threaded by the polymer optical fiber ribbon and comprises dimensions and shape at an exit from the collet such that there is a gap of less than about 400 μm between any point on an inner surface of the channel and a nearest point on an outer surface of the polymer optical fiber ribbon;
   passing the cutting blade, wherein the cutting blade is mounted on a rotatable holder, through the polymer optical fiber ribbon; and
   moving the cutting blade holder as the cutting blade rotates, so that the cutting blade cuts at least one slice, wherein the at least one slice comprises a thickness of about 1 to 200 microns, from the surface of the polymer optical fiber ribbon.

* * * * *